Patented Sept. 13, 1949

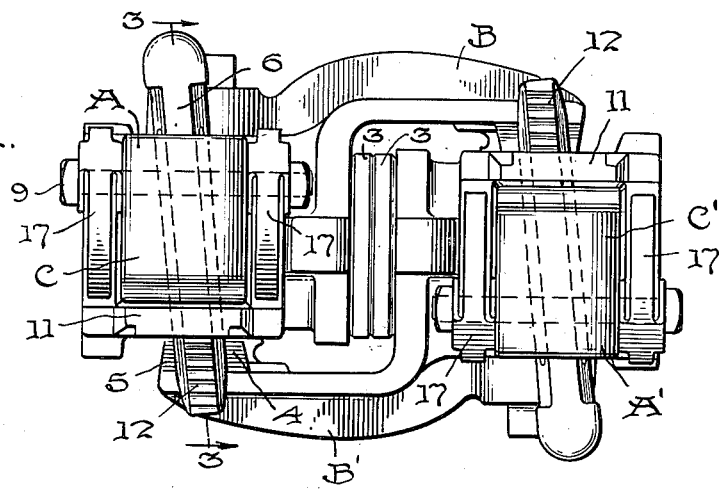

2,482,019

UNITED STATES PATENT OFFICE 2,482,019

COUPLER LOCK

Robert E. McGahey, Alexandria, Va.

Application December 5, 1946, Serial No. 714,345

9 Claims. (Cl. 285—60)

This invention relates to improvements in couplers for hose on pipe ends of the type commonly used to detachably connect the hose ends or flexible end sections of the train pipes of railway cars.

It is an object of the invention to provide an improved key lock for such couplers which shall be more or less universal in use, whereby a coupler provided with the improved locking device may be coupled with any one of a number of similar standard couplers in common use and satisfactorily held in locked relation by the improved locking means even though the two couplers may vary considerably as to dimensions and relative positions of the parts with which the locking device cooperates.

The invention further contemplates the provision of a locking wedge mounted on a coupler head and driven into engagement with an element of a cooperating head to hold the two heads in locked engagement, the wedge being provided with latching means to hold the wedge in any adjusted position.

A further object is to provide a spring pressed latch for the wedge which maintains a downward pressure on the noses of the wedge to hold it in constant engagement with engaged portion of the cooperating coupler head.

A further object is to provide a spring-pressed means operating on the locking wedge to prevent it working loose under the vibration to which it is subjected during use.

The invention is illustrated in the accompanying drawings, in which:

Fig. 1 is a plan view of a pair of coupler heads in locked relation to which the improvement is applied;

Fig. 2 is a side elevation of the construction shown in Fig. 1;

Fig. 3 is a section on line 3—3 of Fig. 1;

Fig. 4 is an end view showing the wedge and spring-pressed latch in operative position;

Fig. 5 is a side view of the latch; and

Fig. 6 is a plan view of the latch looking at it from the bottom in Fig. 3.

The locked assembly shown in Figs. 1 and 2 comprises a pair of similar couplers A and A', each provided with similar projecting arms B and B', and each carrying similar locking devices C and C.'

It will be understood that the locking device C of coupler A will engage the projecting arm B' of coupler A' and that the locking device C' of coupler A' will engage the projecting arm B of coupler A. The two couplers A and A' are joined by the usual gaskets in use with this type of device. Since the two couplers are identical in construction, a description of one only will be given. It will be understood also that the couplers, except for the lock and latch means, are of a standard type and will ordinarily be engageable with any other coupler now in use even though the mating coupler is provided with a different form of locking means.

Each coupler comprises a head or main body portion I provided with a through passage 2 for the passage of steam, air or vapor, and threaded at its outer end for the reception of the usual flexible hose or other flexible construction for connecting the coupler to the train pipe. The inner end of the head is provided with a gasket 3 which cooperates with a similar gasket 3' in the mating coupler to form a continuous passage through the locked couplers as is usual in the art.

An arcuate cam 4 is provided on one side of the head I adapted to be engaged by a similar arcuate cam 5 provided on the inner face of the outer end of the projecting arm of the mating coupler. It will be understood that the couplers are first brought together, each in an upwardly tilted position, and then the couplers are swung downwardly so as to bring the cams 5 of each coupler into engagement with the cams 4 and forcibly clamp the gaskets into contact with each other. This construction is old and in common use. With the couplers in this position, the locking devices C and C' are brought into position to lock the projecting arms B and B' to prevent disengagement of the couplers.

The improved locking device C comprises a locking bar or wedge 6 provided with an enlarged driving head 7. This wedge 7 is rectangular in cross section and is provided with a central longitudinal slot 8, and is designed to have a loose fit in a transverse passage through the upper part of the head I as clearly shown in Fig. 3. The wedge is held in the passage by means of a bolt 9 passing transversely through the passage and through the slot 8 in the wedge. This slot 8 is of sufficient length to permit the wedge to be driven into full locking position and to be driven back to enable the couplers to be separated. The bolt 9 fits loosely in the slot 8 to permit of a pivotal movement of the wedge. The nose or front end of the wedge is inclined upwardly as indicated at 10 to provide an engaging surface with the arm B' to lock the heads together when the wedge is driven into locking position.

As stated above, the wedge fits loosely in its guiding passage and on being driven to locking position the inclined surface 10 rides up on the upper surface of the projecting arm B' and raises the front part of the wedge to engagement with upper wall of the passage and the lower surface of the rear end of the wedge is forced down to engage the wall.

It has been found desirable in this type of device to provide means to force the nose of the wedge downwardly during the driving operation and to keep a downward pressure on the nose at all times while in use. Also due to the rough treatment to which it is subjected during use and the jars and vibrations which naturally occur, devices of this type have a great tendency to wear out and the locking bar to work loose and so fails to perform its intended function.

Consequently, it has been found necessary to provide some means to prevent the wedge from working loose and also to hold the front end down at all times. To this end this invention provides a spring pressed means operating on the front end of the wedge to press it down and also provides means cooperating therewith to prevent the wedge from working out of locking position under the severe jars to which it may be subjected. As disclosed herein, this means takes the form of a spring pressed latch member 11 engaging with a roughened or serrated upper surface 12 of the nose or free end of the locking bar or wedge 6. This latch, as illustrated in the drawings, takes the form of a bail or U-shaped member shown in detail in Figs. 5 and 6, and in applied position in the other figures of the drawing. Specifically, it has a transverse member 13 and two side members 14, 15, provided with openings 16. The latch is held in position by the bolt 9 which passes through the openings 16. To provide the desired spring pressure a spring 17 has been shown, one for each arm of the latch. These springs may take various forms. The spring here shown comprises a flat steel member curved so that its outer engaging end portions are at substantially right angles and provided centrally with eye portions at right angles to the body portion. These eye portions are designed to fit over the free ends of the arms 14, 15, of the latch 11 with the eye in alignment with the openings 16. The springs are thus held in position by the bolt 9 which also holds the latch in position. The free ends of the springs engage respectively a side wall of the head 1 and the upper surface of the latch 11 near the transverse head piece 13. The springs are so designed as to provide the necessary downward pressure on the latch to hold the part 13 in engagement with the serrated surface 12 of the wedge. The relation between the surface 12 and the latch part 13 is such that the wedge may be driven into tight locking position by hammer blows on the head 7 and be driven loose by blows on the nose of the wedge, the part 13 riding over the serrations but maintaining a downward pressure on the nose of the wedge at all times.

The upper portion of the transverse portion 13 of the latch is provided with a slot into which a tool, such as a screwdriver may be inserted to lift the latch out of engagement with the wedge to make it easier to disengage the wedge and reduce wear on the wedge and latch head due to repeated locking and unlocking operations of the couplers with these parts sliding on each other.

Having described my invention, what I claim as new and desire to protect by Letters Patent is:

1. A hose coupler comprising a head and a projecting arm adapted to engage, respectively, the arm and head of a similar mating coupler, said head having an opening in the upper part thereof and transversely of the head, a locking device slidable in said opening, said locking device comprising a locking bar movable lengthwise of itself and transversely of the head to and from a position with the inner end of the bar projected over the arm of the mating coupler, said bar having an upwardly sloping face on its inner end for wedging engagement with the said projecting arm of the mating coupler, spring pressed means mounted on said head and engaging the upper surface of the inner end of the locking bar to maintain a downward pressure thereon to hold the inner end of the bar in engagement with the arm of the mating coupler.

2. A coupling mechanism as set forth in claim 1 in which the upper surface of the inner end of the locking bar is provided with serrations which cooperate with the spring pressed means to latch the locking bar in any adjusted operative position.

3. A mechanism as set forth in claim 1 in which the locking bar is provided with a central longitudinal slot, a bolt mounted in the head and passing through the slot, and in which the spring pressed means is a U-shaped member having its free ends pivotally mounted on the ends of the bolt.

4. A hose coupler comprising a head and a projecting arm adapted to engage, respectively, the arm and head of a mating coupler, a locking device mounted on the head and comprising a locking bar passing transversely through the head and engaging the arm of the mating coupler, a spring pressed member engaging the free inner end of the bar to press it downwardly into engagement with the arm of the mating coupler.

5. A coupler device as defined in claim 4, in which the spring pressed member is pivotally mounted on the coupler head.

6. A coupler device as defined in claim 4, in which the inner end of the bar is provided with serrations on its upper surface and in which the spring pressed member engages the serrations to hold the bar in operative position and prevent it from working loose under normal working conditions.

7. A coupler device as defined in claim 4, in which the spring pressed member is U-shaped and is pivoted on a bolt mounted in the head and passes through a slot in the locking bar.

8. A coupler device as defined in claim 4, in which the pressure on the spring pressed member is provided by a spring mounted on the head and is held in position by a bolt passing through a portion of the head and through a slot in the locking bar and also serving as a pivot for the spring pressed member which is in the form of a bail.

9. A coupler device as defined in claim 4, in which the spring pressed member is bail-shaped having a transverse portion pressing on the locking bar, its free ends being pivoted on the head, and having an opening in its transverse portion for reception of a lifting tool.

ROBERT E. McGAHEY.

REFERENCES CITED

The following references are of record in the file of this patent:

UNITED STATES PATENTS

| Number | Name | Date |
|---|---|---|
| 901,563 | Stoffer | Oct. 20, 1908 |
| 1,100,331 | Simmons | June 16, 1914 |
| 1,266,081 | Sushko | May 14, 1918 |
| 1,642,728 | Mc. K. Glen | Sept. 20, 1927 |